(12) United States Patent
Li et al.

(10) Patent No.: US 12,181,588 B2
(45) Date of Patent: Dec. 31, 2024

(54) SYSTEM AND METHOD FOR DEVICE POWER MANAGEMENT

(71) Applicant: VERIZON PATENT AND LICENSING INC., Basking Ridge, NJ (US)

(72) Inventors: Yuk Lun Li, Morganville, NJ (US); Rohit Shirish Saraf, Nashua, NH (US); Praveen Nair, El Segundo, CA (US); Ritika S. Kagale, Somerville, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 538 days.

(21) Appl. No.: 17/516,966

(22) Filed: Nov. 2, 2021

(65) Prior Publication Data

US 2023/0139480 A1    May 4, 2023

(51) Int. Cl.
| | |
|---|---|
| *G01S 19/43* | (2010.01) |
| *G01S 5/00* | (2006.01) |
| *G01S 19/04* | (2010.01) |
| *G01S 19/07* | (2010.01) |
| *G01S 19/34* | (2010.01) |
| *H04B 7/26* | (2006.01) |

(52) U.S. Cl.
CPC ............. *G01S 19/43* (2013.01); *G01S 5/009* (2013.01); *G01S 19/04* (2013.01); *G01S 19/074* (2019.08); *G01S 19/34* (2013.01); *H04B 7/2628* (2013.01)

(58) Field of Classification Search
CPC ........ G01S 19/43; G01S 19/074; G01S 5/009; G01S 19/04; G01S 19/34
See application file for complete search history.

(56) References Cited

U.S. PATENT DOCUMENTS

| | | | | |
|---|---|---|---|---|
| 2015/0123847 | A1* | 5/2015 | Farmer | G01S 19/34 342/357.74 |
| 2020/0301026 | A1* | 9/2020 | Del Regno | G01S 19/07 |

OTHER PUBLICATIONS

FU CN 106646570 A (Year: 2017).*

* cited by examiner

*Primary Examiner* — Timothy A Brainard
*Assistant Examiner* — Helena H Seraydaryan

(57) ABSTRACT

Disclosed are systems and methods for a power management framework that can computationally minimize the power consumption of a device with Real-Time Kinematic (RTK) enabled. The disclosed framework can analyze the operating characteristics of a device (e.g., applications executing, movement, battery level, signal strength and current battery consumption of the device, and the like), which can provide an indication of the device's need for updated location information, and determine a frequency for updating RTK. Thus, the disclosed framework provides computerized mechanisms for the automatic optimization between the need for an RTK power update and the device's capabilities for actually performing the update.

20 Claims, 10 Drawing Sheets

SYSTEM AND METHOD FOR DEVICE POWER MANAGEMENT

BACKGROUND

Real-Time Kinematic (RTK) is a positioning technique that uses carrier based ranging and provides geographical positioning that are orders of magnitude more precise than those available through code-based positioning. RTK can be used to correct for common errors in current geographic navigation systems (e.g., Global Positioning Systems (GPS)) and satellite navigation systems (e.g., Global Navigation Satellite Systems (GNSS)).

BRIEF DESCRIPTION OF THE DRAWINGS

The features, and advantages of the disclosure will be apparent from the following description of embodiments as illustrated in the accompanying drawings, in which reference characters refer to the same parts throughout the various views. The drawings are not necessarily to scale, emphasis instead being placed upon illustrating principles of the disclosure.

DETAILED DESCRIPTION OF EXAMPLE EMBODIMENTS

The disclosed systems and methods provide a framework that is configured to provide pinpoint level accuracy for location applications while maintaining a minimum level of power usage for a device operating or executing such applications.

According to some embodiments, network providers can utilize (or deploy) RTK reference base stations to supplement GPS data. This facilitates centimeter-levels of location accuracy for location applications. For example, drone delivery, autonomous vehicles, asset tracking, maps, person tracking, and the like, may all require precision levels of accuracy to operate correctly.

However, with such precise location requirements, power drain of the executing devices surfaces as a logistical tradeoff. Since RTK requires more frequent data updates and more power for the enhanced level of accuracy, the devices executing the applications where RTK is deployed suffer from extensive power drain and power management issues.

The disclosed systems and methods provide a computerized power management framework that can computationally minimize the power consumption of a device with RTK enabled. As discussed in more detail below, the disclosed framework can analyze the operating characteristics of a device (e.g., movement, battery level, signal strength and current battery consumption data, and the like), which can provide an indication of the device's need for updated location information, and determine a frequency for updating RTK (e.g., referred to as an update rate). Thus, the disclosed framework provides computerized mechanisms for the automatic optimization between the need for an RTK power update and the device's capabilities for actually performing the update (e.g., will the RTK update over-drain or unnecessarily use power from the device), as discussed below.

Figure 1:
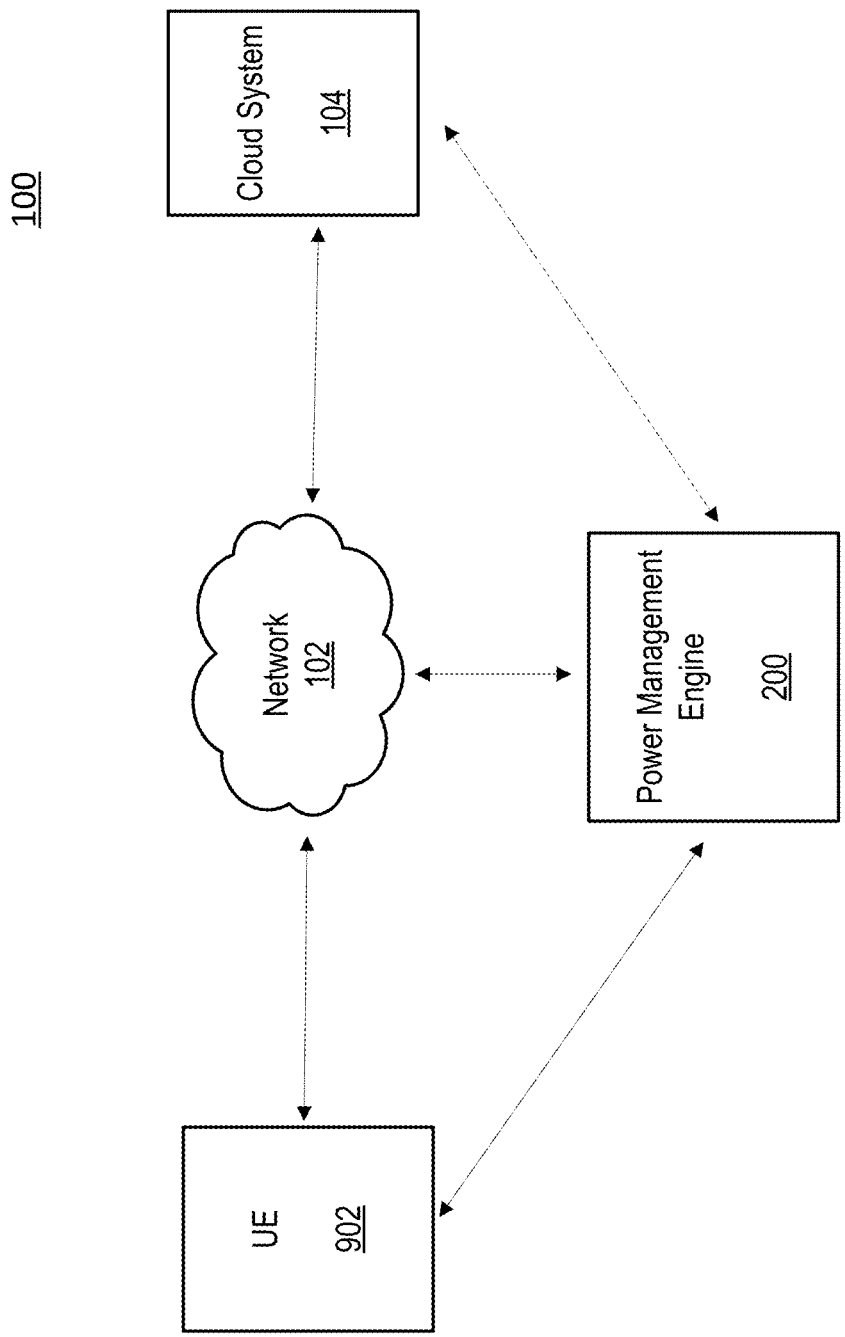
FIG. 1 is a block diagram of an example configuration within which the systems and methods disclosed herein could be implemented according to some embodiments of the present disclosure.

With reference to FIG. 1, system 100 is depicted which includes user equipment (UE) 902, network 102, cloud system 104 and power management engine 200. UE 902 can be any type of device, such as, but not limited to, a mobile phone, tablet, laptop, sensor, Internet of Things (IoT) device, autonomous machine, and any other device equipped with a cellular or wireless or wired transceiver. Further discussion of UE 902 is provided below in reference to FIG. 9.

Network 102 can be any type of network, such as, but not limited to, a wireless network, cellular network, the Internet, and the like. Network 102 facilitates connectivity of the components of system 100, as illustrated in FIG. 1. A further discussion of the network configuration and type of network is provided below in reference to FIG. 8.

Cloud system 104 can be any type of cloud operating platform and/or network based system upon which applications, operations, and/or other forms of network resources can be located. For example, system 104 can be a third party service provider and/or network provider from where location reliant applications can be accessed, sourced or executed from. In some embodiments, cloud system 104 can include a server(s) and/or a database of information which is accessible over network 102. In some embodiments, a database (not shown) of cloud system 104 can store a dataset of data and metadata associated with local and/or network information related to a user(s) of UE 902 and the UE 902, and the services, applications, content rendered and/or executed by UE 902.

Power management engine 200, as discussed above, includes components for optimizing power consumption of devices (UE 902) connected to network 102. Power management engine 200 can be a special purpose machine or processor and could be hosted by UE 902. In some embodiments, engine 200 can be hosted by a peripheral device connected to UE 902.

According to some embodiments, as discussed above, power management engine 200 can function as an application installed on UE 902. In some embodiments, such application can be a web-based application accessed by UE 902 over network 102 from cloud system 104 (e.g., as indicated by the connection between network 102 and engine 200, and/or the dashed line between cloud system 104 and engine 200 in FIG. 1). In some embodiments, engine 200 can be configured and/or installed as an augmenting script, program or application (e.g., a plug-in or extension) to another application or program executing on UE 902.

Figure 2:
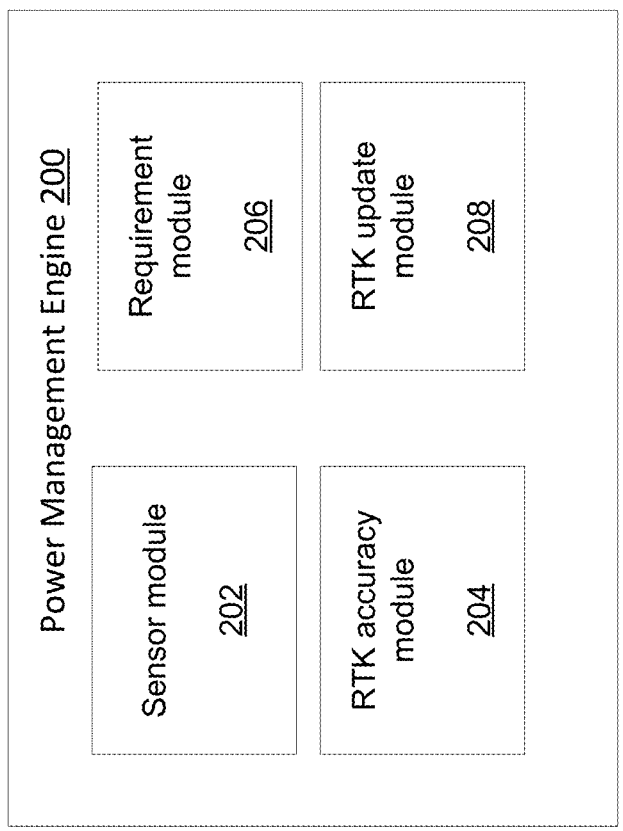
FIG. 2 is a block diagram illustrating components of an exemplary system according to some embodiments of the present disclosure.

As illustrated in FIG. 2, according to some embodiments, power management engine 200 includes sensor module 202, RTK accuracy module 204, requirement module 206, RTK update module 208, as illustrated in FIG. 2. It should be understood that the engine(s) and modules discussed herein are non-exhaustive, as additional or fewer engines and/or modules (or sub-modules) may be applicable to the embodiments of the systems and methods discussed. More detail of the operations, configurations and functionalities of engine 200 and each of its modules, and their role within embodiments of the present disclosure will be discussed below in relation to FIG. 3.

Figure 3:
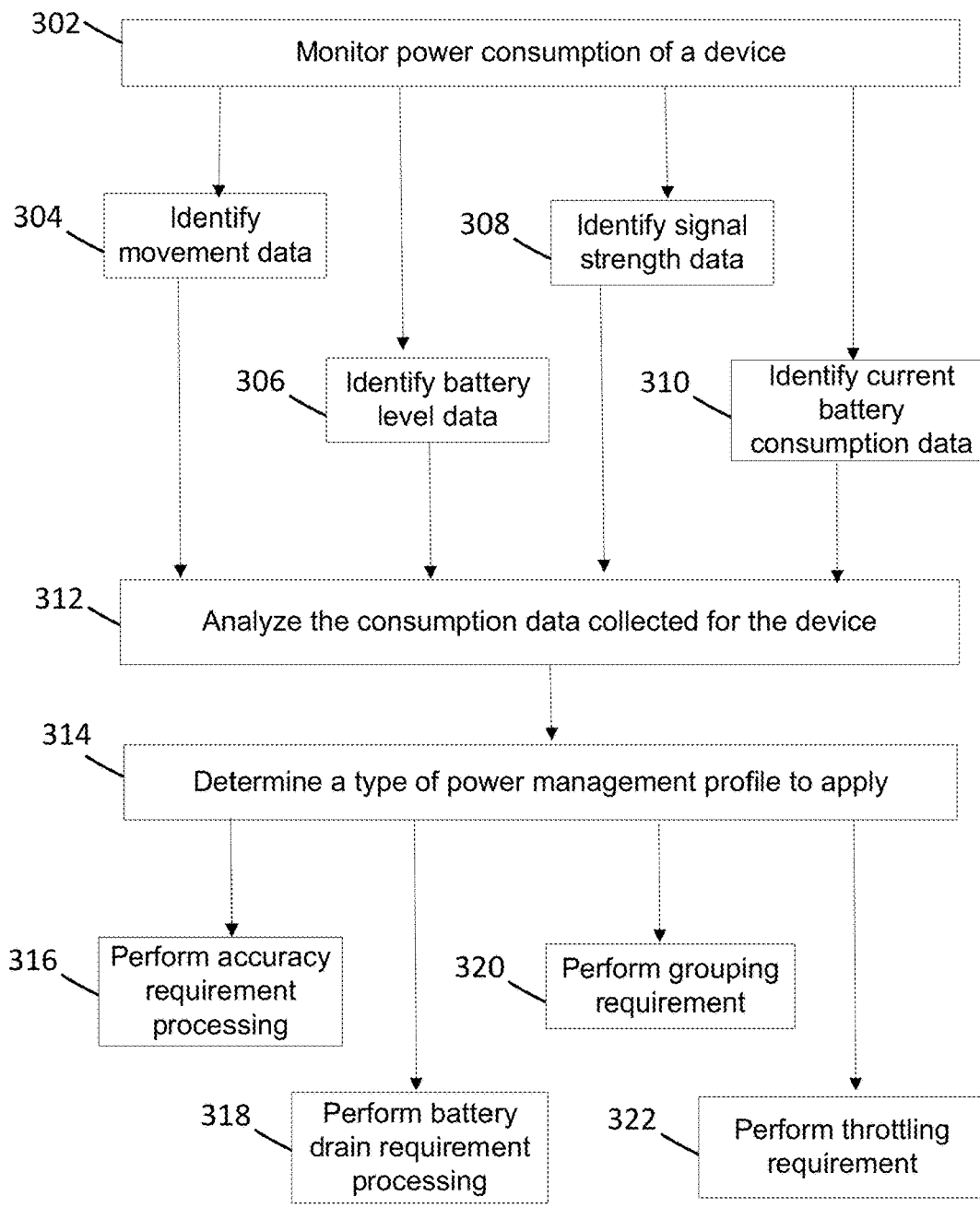
FIG. 3 illustrates an exemplary data flow according to some embodiments of the present disclosure.

FIG. 3 provides Process 300 which details non-limiting example embodiments of managing power consumption of a device with RTK enabled. According to some embodiments, as discussed herein, power management engine 200 can determine an update rate for the device based on the device's power management profile, applications it is currently executing and/or sensor data that correspond to the device's operations in the real-world and digital world (e.g., location of the device, movement of the device, battery level of the device, signal strength and current battery consumption, for example).

According to some embodiments, Steps 302-310 of Process 300 can be performed by sensor module 202 of power management engine 200; Step 312 can be performed by RTK accuracy module 204; Step 314 can be performed by requirement module 206; and Steps 316-322 (and their respective sub-steps discussed in relation to FIGS. 4-7, respectively) can be performed by RTK update module 208.

Process 300 begins with Step 302 where the power management engine 200 monitors the power consumption of a device (e.g. UE 902) via the sensors on the device. According to some embodiments, such monitoring involves identifying which applications the programs are executing and the location of the device. Step 302 can involve identifying that an application is requesting and/or needs location information, particularly precision location information that RTK can provide. Thus, Step 302 can involve monitoring the power consumption of the device based on a recognized need by an application executing on the device (e.g., an application that needs location information to operate, for example).

In some embodiments, the monitoring further includes pinging the sensors associated with the device to further determine operating characteristics of the device. These characteristics can pertain to the current operating environment of the device. The operating characteristics can include, but are not limited to, movement of the device, battery level of the device, signal strength the device is currently receiving and current battery consumption by the device. For example, Step 302 can involve power management engine 200 receiving data from the device's 3D accelerator(s) that can indicate the device's current movement data.

Thus, in Steps 304-310, power management engine 200 can determine the operating characteristics of the device. For example, in Step 304, movement data of the device can be identified, which relates to the device's physical movements. In Step 306, battery level data for the device can be identified, which relates to the device's current battery level. In Step 308, signal strength data for the device can be identified, which as discussed below, relates to a strength of signals that relay location information to the device. And, in Step 310, current battery consumption data can be determined, which relates to rates of consumption, or power drain, that are occurring based on operations currently executing by the device and/or applications executing thereon.

It should be understood that while Process 300 only discusses the above mentioned characteristics, it should not be construed as limiting, as more, alternative, or less characteristics of the device and/or its operating environment and executing applications can be utilized to determine the device's power profile and required RTK usage, as discussed herein.

In Step 312, power management engine 200 analyzes the consumption data collected for the device. In some embodiments, this consumption data includes the data collected in Steps 304-310. In some embodiments, the consumption data can further include the data collected in Step 302 (e.g., identity of the application requesting or requiring location information, and/or the location of the device at the time of the request).

In some embodiments, the analysis can involve executing any type of known or to be known machine learning classifier that can filter data, and prioritize particular types of data for the purposes of managing a device's power, such as, but not limited to, decision tree processing, for example.

In Step 314, power management engine 200 determines a type of power management profile for the device to apply based on the analysis from Step 312. Step 314 results in a determination as to which power requirement controls an RTK update, and whether it is to be performed, when it is to be performed, and/or at what rate it is to be performed.

According to some embodiments, power management engine 200 can select from a group of power requirements that includes, but is not limited to, an accuracy requirement, a battery drain requirement, a grouping requirement and a throttling requirement. As discussed below, the accuracy requirement (in Step 316, and FIG. 4) can be at least based on movement data of the device; the battery drain requirement (in Step 318, and FIG. 5) can be at least based on battery level and/or current battery consumption data of the device; and the grouping requirement (in Step 320, and FIGS. 6A-6B) can be based on signal strength data (and, in some embodiments, location data) of the device. In some embodiments, the throttling requirement (in Step 322, and FIG. 7) can be applied separately and/or in combination with each other requirement based on movement data (e.g., movement speeds) of the device, as discussed below.

In some embodiments, power management engine 200 proceeds from Step 314 to Step 316 when it determines that the movement data may impact RTK accuracy. In some embodiments, if no movement is detected, then RTK accuracy can be maintained by extending the RTK update rates (e.g., extend the update period to occur less frequently). In some embodiments, if movement is occurring beyond a threshold amount (e.g., 1 centimeter, for example), then RTK update rates may be increased so as to ensure the accuracy of RTK on the device.

Figure 4:
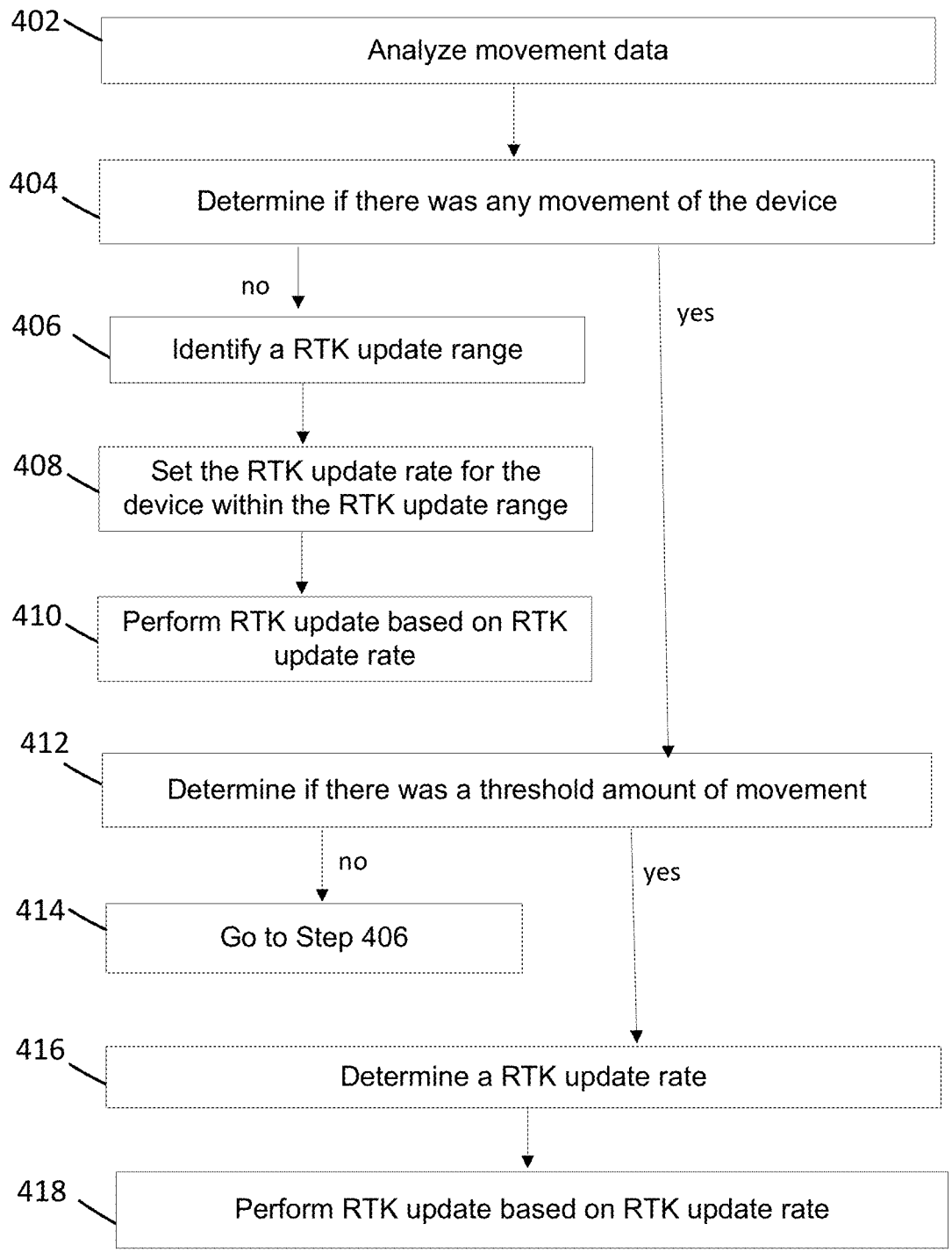
FIG. 4 illustrates an exemplary data flow according to some embodiments of the present disclosure.

The processing performed in Step 316 is detailed in relation to FIG. 4 and Steps 402-418. The processing of Step 316 begins with Step 402 where the movement data (collected from Step 304) is identified and analyzed.

In Step 404, a determination is made regarding whether there was any movement ($R_m$) of the device (e.g., movement beyond a centimeter, for example). In some embodiments, if there was no movement (e.g., the device was stationary), then Step 406 is performed where a threshold RTK update range is identified.

According to some embodiments, the threshold RTK update range ($U(R_A)_A$) can be based on a base RTK update period (U) and a max RTK update period ($U_m$), where $R_A$ is a max accuracy in distance (e.g., vector). Anything below the base RTK update period and above the max RTK update period may cause errors in accuracy.

In Step 408, the RTK update rate ($U_s$) for the device can be set within the RTK update range ($U(R_A)_A$) determined in Step 406.

Then, in Step 410, the RTK update can be performed based on the RTK update rate determined in Step 408.

In some embodiments, if movement ($R_m$) was detected from the movement data in Step 404, the processing proceeds to Step 412, where a determination is made regarding whether a threshold amount of movement occurred. In some embodiments, if the movement is below the threshold (e.g., at a level that does not warrant an update as it is so minimal—for example, less than 1 centimeter), then Step 414 can be performed, which causes the steps discussed above in relation to and subsequent to Step 406 to be performed.

In some embodiments, when the movement detected exceeds the threshold amount of movement (e.g., 5 feet, for example), processing proceeds from Step 412 to Step 416. In Step 416, an RTK update rate is determined. In some embodiments, this rate can be based on, but not limited to, the amount of movement ($R_m$), a max accuracy of distance ($R_A$), a number of samples (K(n)) for $R_m$ while maintaining $R_m$, and a maximum number of samples ($K_{max}$) for U and $U_m$.

According to some embodiments, Step 416 can involve calculating the average distance moved as indicated by the movement data ($R_{AVG}$), and then determine an update period ($U_s(n)$) and a number of samples for that period ($K(R_{AVG})$). This will provide the RTK update rate.

In some embodiments, for example:

$$R_{AVG}=\mathrm{avg}(R_m(n), R_m(n-1), \ldots R_m(n-K));$$

$$U_S(n)=\min(U(R_{AVG}), U_m);\text{ and}$$

$K(R_{AVG})=\mathrm{INT}(\mathrm{abs}(\log_x(R_{AVG})))$ where X is <1 and $0<=K<=K_{max}$, where for high movements (e.g. movement beyond a threshold amount of distance), K is small; and for low movements (e.g., movement below a threshold amount of distance), K can be larger.

Upon determining the RTK update rate in Step 416, Step 418 can be performed where the RTK update can be performed based on the determined RTK update rate.

In some embodiments, power management engine 200 proceeds from Step 314 to Step 318 when it determines that the battery level data may impact RTK accuracy. In some embodiments, as discussed below, if the battery level of the device is too low (e.g., below a threshold battery level—e.g., at or below about 25% of max power or full charge), then an optimization between the application's need for an RTK update versus the current battery level can be performed, and whether an RTK update can and/or should be performed is determined therefrom. As discussed below, the application's need and/or user's need for the application it is executing to have precise data may dictate whether the RTK update is performed. For example, if the user is using a maps application, then precise location information is required, and the device's battery level may be deemed a lower priority.

Figure 5:
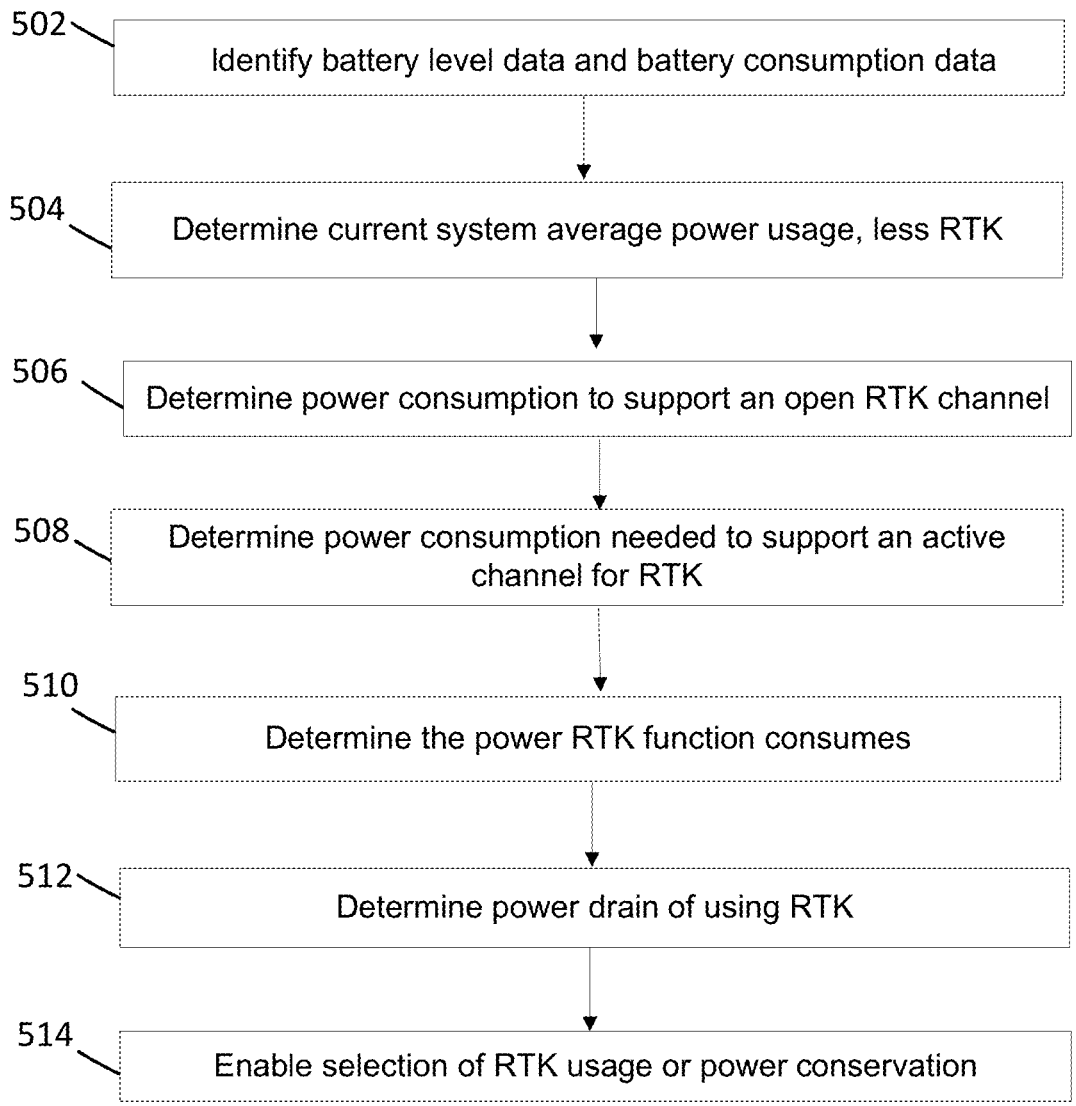
FIG. 5 illustrates an exemplary data flow according to some embodiments of the present disclosure.

The processing performed in Step 318 is detailed in relation to FIG. 5 and Steps 502-514. The processing of Step 318 begins with Step 502 where the battery level data (collected from Step 306) and battery consumption data (collected from Step 310) are identified and analyzed.

In Step 504, current system average power usage, less RTK, is determined ($P_{sys}$). In some embodiments, Step 504 can involve analyzing the battery level data (from Step 306), and the current battery consumption data (from Step 310), and determine the power consumption of the device's operations that are not RTK reliant.

In Step 506, power consumption needed to have an open RTK channel ($P_{CON}$(NET)) is determined. In some embodiments, this can involve identifying power required to connect to a reference base station or mobile station for receiving RTK signals, as discussed below in relation to FIGS. 6A-6B.

In Step 508, power consumption needed to support an active channel for RTK over the open channel is determined ($P_{DATA}$(S/N)). In some embodiments, this determination can be based on power required to activate an RTK algorithm so that the RTK data can be received over the open channel and utilized to augment/supplement GPS data.

In Step 510, a determination is made regarding the power an RTK function consumes ($P_{RTK}(R_A)$). According to some embodiments, the determination of Step 510 can be represented as follows:

$$P_{RTK}(R_A)=P_{DATA}(S/N)+P_{CON}(\mathrm{NET})+P_{HWSW}$$

In Step 512, a determination is then made regarding the power drain of the device (and the executing application) using RTK. In some embodiments, this can be based on the results from Step 510 and 504; in other words: $P_{RTK}(R_A)+P_{sys}$.

Then, in Step 514, power management engine 200 enables a selection of RTK usage or power conservation (e.g., no RTK update or usage). In some embodiments, the selection can be automatically performed based on the power drain from Step 512. For example, if the power drain value is at or below a threshold level of power drain, then RTK can be enabled, and vice versa. In some embodiments, Step 514 can present options to a user for the selection to perform RTK, to by-pass a RTK update and conserve power, or determine an adjusted RTK rate (in a similar manner as discussed above) that reduces the power drain (e.g., a lower time (T) value).

According to some embodiments, should power management engine 200 or the user select power conservation over RTK usage, then a notification can be sent to the requesting application by power management engine 200 that indicates a sub-optimal precision may be resultant.

In some embodiments, power management engine 200 proceeds from Step 314 to Step 320 when it determines that the signal strength data may impact RTK accuracy. Therefore, in Step 320, and the sub-steps of FIG. 6A, grouping can be utilized as a way to reduce battery consumption. As discussed below, devices can be grouped or relied upon in an on-demand manner such that one device acts a primary device, which can relay RTK data to assigned (or connected) secondary devices that are operating in low power modes.

In some embodiments, devices from different users can be grouped; and in some embodiments, paired or IoT devices can be grouped (e.g., a pair of smart glasses or a smartwatch paired to a user's smartphone). In such embodiments, for example, the user's smartphone can act as a primary device, and the peripheral glasses or watch can act as a secondary device operating in low power mode, as discussed below.

Figure 6A:
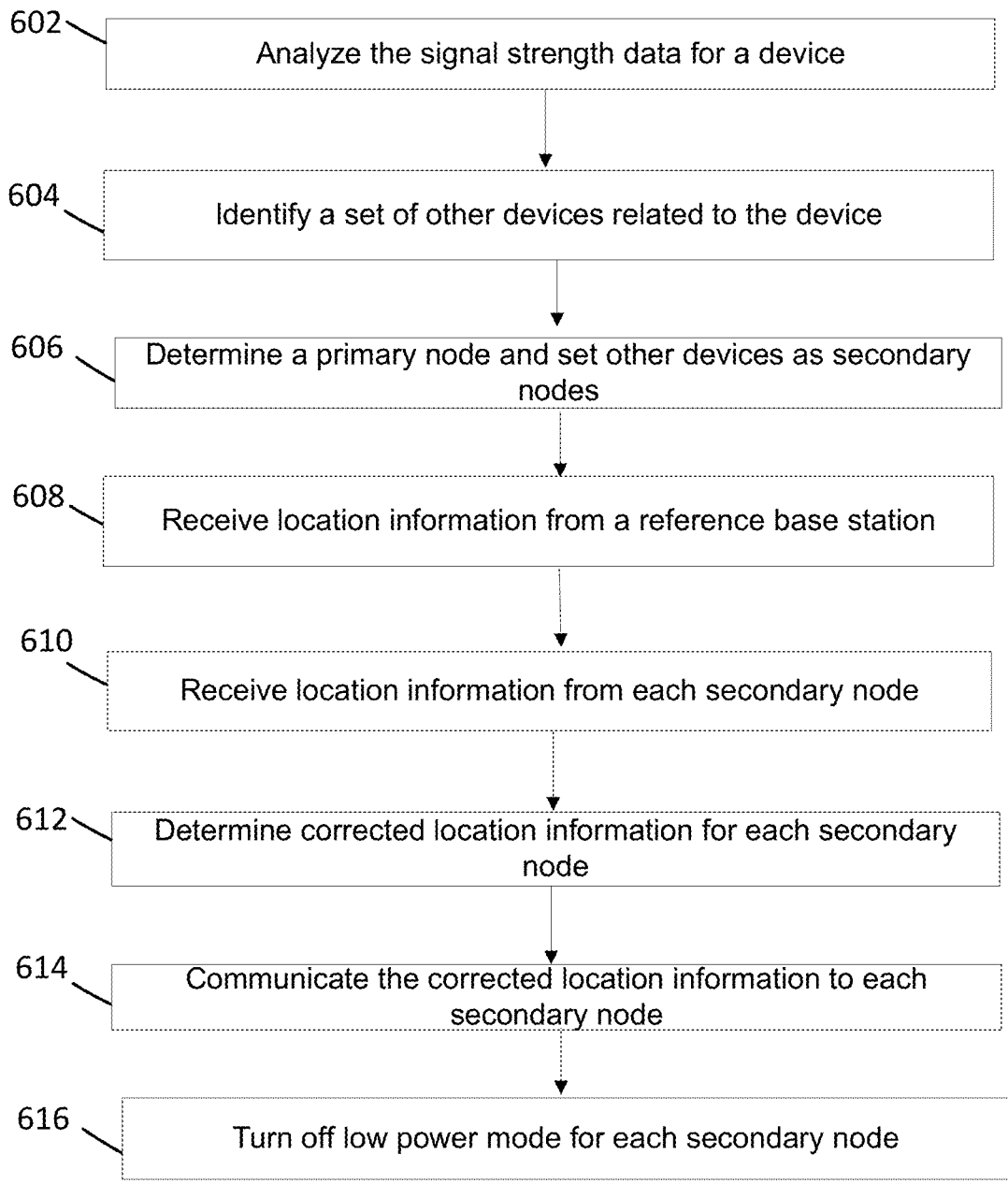
FIG. 6A illustrates an exemplary data flow according to some embodiments of the present disclosure.
Figure 6B:
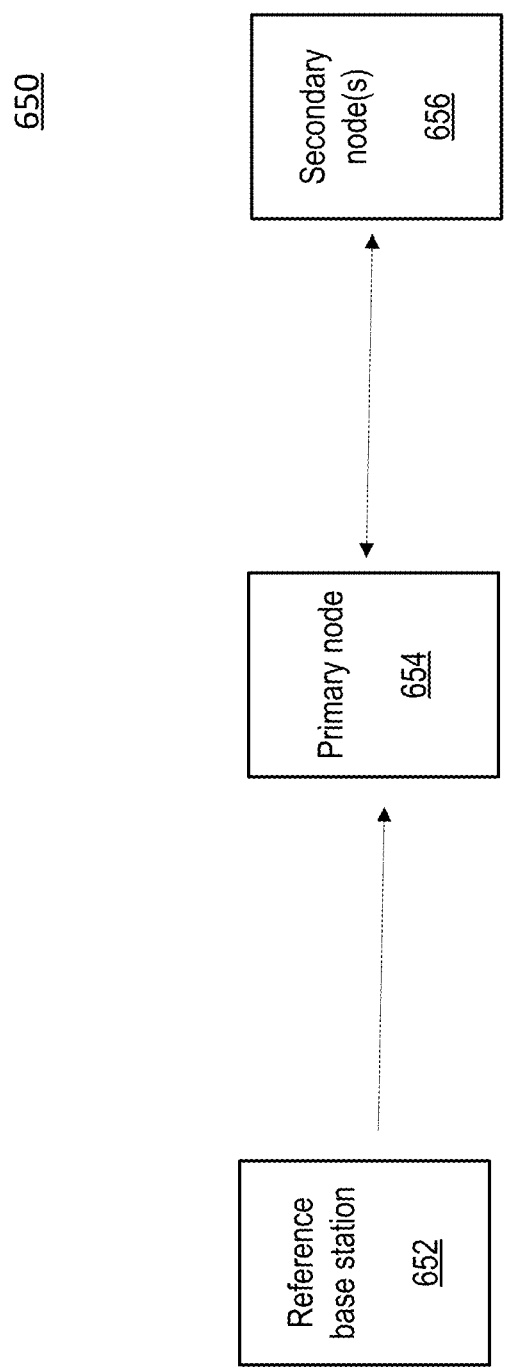
FIG. 6B is a block diagram of an example network configuration according to some embodiments of the present disclosure.

The processing performed in Step 320 is detailed in relation to FIG. 6A and Steps 602-616. FIG. 6B illustrates a non-limiting example embodiment depicting a grouping configuration of devices for power optimization, as discussed below.

The processing of Step 320 begins with Step 602 where signal strength data for the device is identified. According to some embodiments, the signal strength, which can be associated with the RTK signals, GPS, GNSS or wireless network, for example, can be based on a variety of factors, including, but not limited to, environmental characteristics (e.g., in the ionosphere or troposphere, and the signal path delays based therefrom), receiver offsets, carrier wavelengths, noise components (e.g., multipath), geometrical range to the reference base station that provides GPS data for the device (e.g., the satellite), and the like.

In Step 604, a set of other devices related to the device are identified and their signal strength information are identified. In some embodiments, these devices may be geographically located, connected via IoT, have a similar signal strength, be moving in a similar direction, be associated with the same or different user, and the like, or some combination thereof.

In Step 606, power management engine 200 analyzes the signal strength data for the device and the set of devices, and determines which device to set as a primary device. The primary device is the device that acts in normal power consumption mode (e.g., GPS and RTK enabled and active), while the other devices are set to low power modes (e.g., RTK disabled, and with an increased sleep cycle and decreased power requests from operations and applications on the device, for example). Low power mode also turns off GPS and RTK functionality for the acting devices.

In some embodiments, the device with the strongest signal strength can be designated as the primary node 654, which can, as discussed above, be based on the strength of connection to reference base station 652, geometrical range to the device, and/or its relation to the other devices.

As illustrated in the example network embodiment 650 in FIG. 6B, a device is set as a primary node 654 to reference base station 652, and acts as a positional intermediary for precise location data from the reference base station 652 for each connected secondary node 656.

According to some embodiments, RTK can use a fixed station—reference base station 652 or a mobile station (not shown). For purposes of this disclosure, a reference base station 652 will be discussed, but it should not be construed that usage, implementation and/or reliance on a mobile station alters the scope of the instant disclosure.

A reference base station 652 broadcasts to connected devices (here, primary node 654) network observations/measurement, GPS coordinates, corrections to the GPS coordinates and virtual reference station (VRS) coordinates. As discussed below, this information can be relayed from reference base station 652 to the device acting as the primary node 654, which leverages the base station information to adjust (e.g., correct) received location data from devices acting as secondary nodes 656 that are operating in low power modes. The device acting as the primary node 654 then transmits the corrected/updated location data to the secondary nodes 656 so that they get precise location information while executing in low power mode and conserving power.

As discussed below, the secondary nodes 656 can transmit their location information to the primary node 654, for example, via wireless communication channels, Bluetooth® or Bluetooth® Low Energy (BLE) signals. In some embodiments, the location information determined and sent by the secondary nodes 656 can comprise space coordinates (e.g., x,y), for example. As discussed below, these coordinates can then be adjusted by the primary node 654 based on the received location information from the reference base station 652, and sent back to each secondary node 656.

Continuing with the processing of FIG. 6A, after selecting the primary node 654 (and designating the other devices as secondary nodes 656) in Step 606, Step 608 is performed where location information from the reference base station 652 is received by the device acting as the primary node 654. As discussed above, this location information can be in the form of network data and location coordinates and measurements, as discussed above.

In Step 610, the device acting as the primary node 654 then receives location information from each device designated as a second node 656. As discussed above, since each secondary node 656 is operating in low power mode with RTK and GPS functionality turned off, the location information cannot be GPS or RTK data, but is rather space coordinates the device was able to triangulate (e.g., x,y coordinates of the device).

In Step 612, based on the location information received from the reference base station 610 and the location information received from each secondary node 656, the power management engine 200 executing on the device acting as the primary node 654 can determine corrected location information for each secondary node 656. This corrected information provides precise, RTK-based geographical positioning information for each secondary node 656.

In some embodiments, the information can be compiled as a separate message for each secondary node 656; and in some embodiments, the message can be a group message to be sent to each secondary node 656. In some embodiments, the group message can comprise information related to each secondary node 656, which can include, but is not limited to, adjusted space coordinates, RTK corrected GPS data, session length, carrier wavelength, time intervals and the like. In a similar manner, the individual message for each secondary node 656 can contain the same information, but only in a manner that is specific for that device.

In Step 614, the compiled message(s) of corrected location information is sent to each secondary node 656. This, therefore, provides precision level location information for each secondary node 656 despite each device having RTK and GPS disabled. And, as a result of receiving corrected/updated location information, each secondary node is able to turn off low power mode, as in Step 616.

Figure 7:
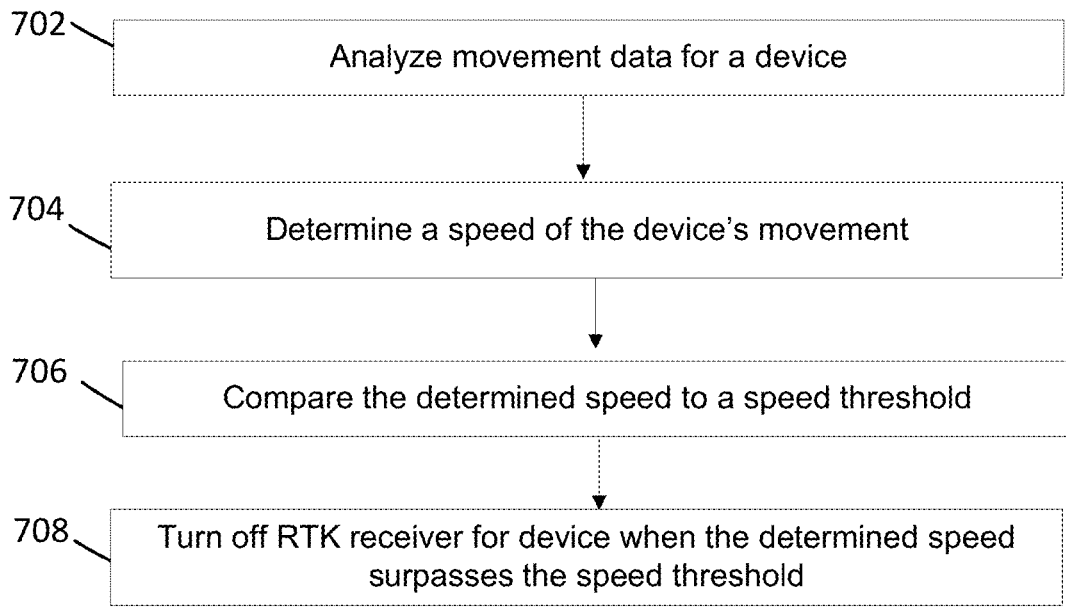
FIG. 7 illustrates an exemplary data flow according to some embodiments of the present disclosure.

In some embodiments, power management engine 200 proceeds from Step 314 to Step 322 when it determines that the device is moving faster than a predetermined speed, and RTK updates are an unnecessary power drain as GPS data can provide an adequate location tracking option due to the geographical traversal of positions occurring at certain speeds The processing performed in Step 322 is detailed in relation to FIG. 7 and Steps 702-708. The processing of Step 322 begins with Step 702 where movement data for the device is identified and analyzed.

In Step 704, a speed of the device's movement is determined based on the movement data. In some embodiments, this can be performed based on the devices' traversal of GPS coordinates over a period of time, as derived and determined from the movement data of the device.

In Step 706, the determined speed of the device is compared to a speed threshold (e.g., 50 mph). In some embodiments, the speed threshold can be based on the context of the device's operation (e.g., a user using the device on a train, then the speed threshold may be greater than if the user is on an elevator). In some embodiments, if the speed is at or below the threshold, then RTK can remain enabled.

In some embodiments, in Step 708 if the speed surpasses the threshold, then power management engine 200 can function to turn off the RTK receiver for the device, thereby disabling RTK functionality (and therefore, as a by-product, extending the battery life of the device).

Therefore, once the speed threshold is crossed, the device can throttle RTK location tracking and use regular GPS tracking since precision level tracking at such excess speeds may not be required.

In some embodiments, power management engine 200 can continue to monitor the speed of the device, and should it drop back below the speed threshold (or be subject to another threshold as the context of the device's operation may change), the device's RTK receiver can be turned back on, thereby enabling precision level location tracking via RTK functionality. In some embodiments, this can occur recursively at predetermined time periods to determine an RTK status so as to ensure RTK is not unnecessarily enabled while the device is in an excess of motion.

Figure 8:
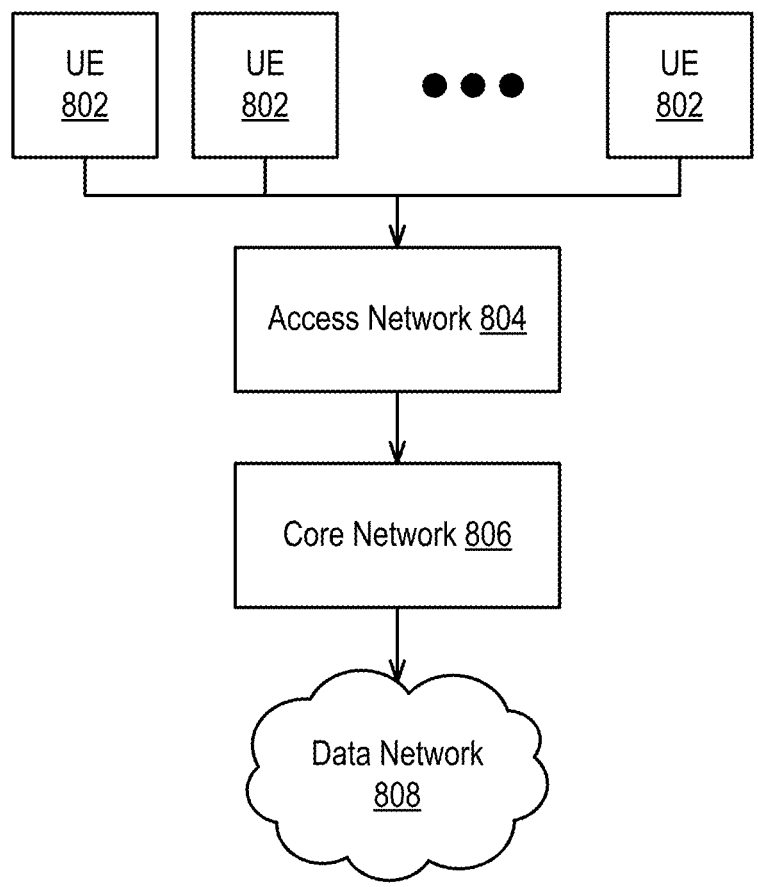
FIG. 8 is a block diagram of an example network architecture according to some embodiments of the present disclosure.

FIG. 8 is a block diagram of an example network architecture according to some embodiments of the present disclosure. In the illustrated embodiment, UE 902 accesses a data network 808 via an access network 804 and a core network 806. In the illustrated embodiment, UE 902 comprises any computing device capable of communicating with the access network 804. As examples, UE 902 may include mobile phones, tablets, laptops, sensors, IoT devices, autonomous machines, unmanned aerial vehicles (UAVs), wired devices, wireless handsets, and any other devices equipped with a cellular or wireless or wired transceiver. One non-limiting example of a UE is provided in FIG. 9.

In the illustrated embodiment of FIG. 8, the access network 804 comprises a network allowing network communication with UE 902. In general, the access network 804 includes at least one base station that is communicatively coupled to the core network 806 and coupled to zero or more UE 902.

In some embodiments, the access network 804 comprises a cellular access network, for example, a fifth-generation (5G) network or a fourth-generation (4G) network. In one embodiment, the access network 804 can comprise a Next-Gen Radio Access Network (NG-RAN), which can be communicatively coupled to UE 902. In an embodiment, the access network 804 may include a plurality of base stations (e.g., eNodeB (eNB), gNodeB (gNB)) communicatively connected to UE 902 via an air interface. In one embodiment, the air interface comprises a New Radio (NR) air interface. For example, in a 5G network, UE 902 can be communicatively coupled to each other via an X2 interface.

In the illustrated embodiment, the access network 804 provides access to a core network 806 to the UE 902. In the illustrated embodiment, the core network may be owned and/or operated by a network operator (NO) and provides wireless connectivity to UE 902 via access network 804. In the illustrated embodiment, this connectivity may comprise voice and data services.

At a high-level, the core network 806 may include a user plane and a control plane. In one embodiment, the control plane comprises network elements and communications interfaces to allow for the management of user connections and sessions. By contrast, the user plane may comprise network elements and communications interfaces to transmit user data from UE 902 to elements of the core network 806 and to external network-attached elements in a data network 808 such as, but not limited to, the Internet, a local area network (LAN), a wireless LAN, a wide area network (WAN), a mobile edge computing (MEC) network, a private network, a cellular network, and the like.

In the illustrated embodiment, the access network 804 and the core network 806 may be operated by a NO. However, in some embodiments, the networks (804, 806) may be operated by a private entity, different entities, and the like, and may be closed to public traffic. In these embodiments, the operator of the device can simulate a cellular network, and UE 902 can connect to this network similar to connecting to a national or regional network.

Figure 9:
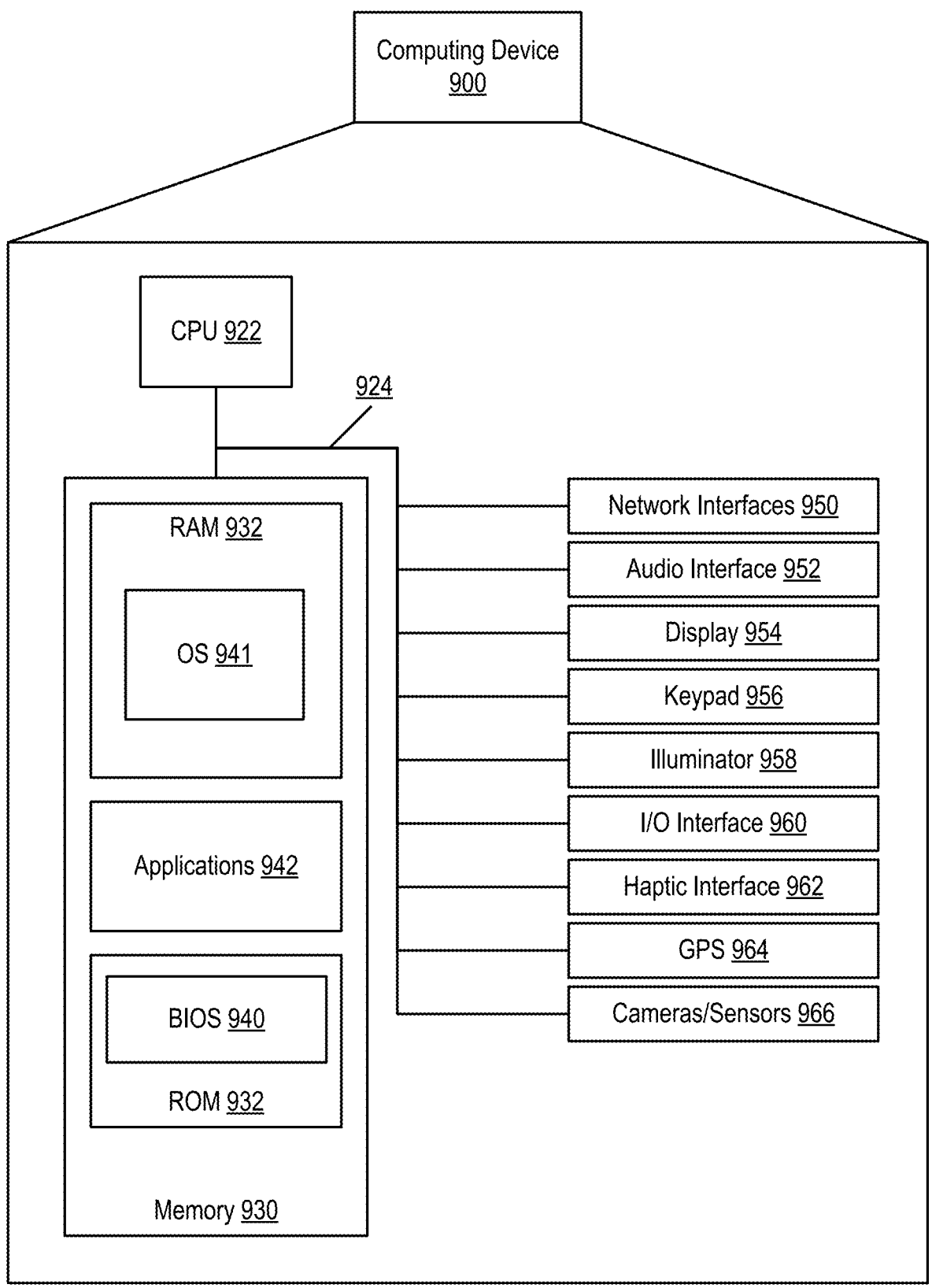
FIG. 9 is a block diagram illustrating a computing device showing an example of a client or server device used in various embodiments of the present disclosure.

FIG. 9 is a block diagram illustrating a computing device 900 showing an example of a client or server device used in the various embodiments of the disclosure. Computing device 900 can be a representation of UE 902, as mentioned above.

The computing device 900 may include more or fewer components than those shown in FIG. 9, depending on the deployment or usage of the device 900. For example, a server computing device, such as a rack-mounted server, may not include audio interfaces 952, displays 954, keypads 956, illuminators 958, haptic interfaces 962, GPS receivers 964, or cameras/sensors 966. Some devices may include additional components not shown, such as graphics processing unit (GPU) devices, cryptographic co-processors, artificial intelligence (AI) accelerators, or other peripheral devices.

As shown in FIG. 9, the device 900 includes a central processing unit (CPU) 922 in communication with a mass memory 930 via a bus 924. The computing device 900 also includes one or more network interfaces 950, an audio interface 952, a display 954, a keypad 956, an illuminator 958, an input/output interface 960, a haptic interface 962, an optional GPS receiver 964 (and/or an interchangeable or additional GNSS receiver) and a camera(s) or other optical, thermal, or electromagnetic sensors 966. Device 900 can include one camera/sensor 966 or a plurality of cameras/sensors 966. The positioning of the camera(s)/sensor(s) 966 on the device 900 can change per device 900 model, per device 900 capabilities, and the like, or some combination thereof.

In some embodiments, the CPU 922 may comprise a general-purpose CPU. The CPU 922 may comprise a single-core or multiple-core CPU. The CPU 922 may comprise a system-on-a-chip (SoC) or a similar embedded system. In some embodiments, a GPU may be used in place of, or in combination with, a CPU 922. Mass memory 930 may comprise a dynamic random-access memory (DRAM) device, a static random-access memory device (SRAM), or a Flash (e.g., NAND Flash) memory device. In some embodiments, mass memory 930 may comprise a combination of such memory types. In one embodiment, the bus 924 may comprise a Peripheral Component Interconnect Express (PCIe) bus. In some embodiments, the bus 924 may comprise multiple busses instead of a single bus.

Mass memory 930 illustrates another example of computer storage media for the storage of information such as computer-readable instructions, data structures, program modules, or other data. Mass memory 930 stores a basic input/output system ("BIOS") 940 for controlling the low-level operation of the computing device 900. The mass memory also stores an operating system 941 for controlling the operation of the computing device 900.

Applications 942 may include computer-executable instructions which, when executed by the computing device 900, perform any of the methods (or portions of the methods) described previously in the description of the preceding Figures. In some embodiments, the software or programs implementing the method embodiments can be read from a hard disk drive (not illustrated) and temporarily stored in RAM 932 by CPU 922. CPU 922 may then read the software or data from RAM 932, process them, and store them to RAM 932 again.

The computing device 900 may optionally communicate with a base station (not shown) or directly with another computing device. Network interface 950 is sometimes known as a transceiver, transceiving device, or network interface card (NIC).

The audio interface 952 produces and receives audio signals such as the sound of a human voice. For example, the audio interface 952 may be coupled to a speaker and microphone (not shown) to enable telecommunication with others or generate an audio acknowledgment for some action. Display 954 may be a liquid crystal display (LCD), gas plasma, light-emitting diode (LED), or any other type of display used with a computing device. Display 954 may also include a touch-sensitive screen arranged to receive input from an object such as a stylus or a digit from a human hand.

Keypad 956 may comprise any input device arranged to receive input from a user. Illuminator 958 may provide a status indication or provide light.

The computing device 900 also comprises an input/output interface 960 for communicating with external devices, using communication technologies, such as USB, infrared, Bluetooth™, or the like. The haptic interface 962 provides tactile feedback to a user of the client device.

The optional GPS transceiver 964 can determine the physical coordinates of the computing device 900 on the surface of the Earth, which typically outputs a location as latitude and longitude values. GPS transceiver 964 can also employ other geo-positioning mechanisms, including, but not limited to, triangulation, assisted GPS (AGPS), E-OTD, CI, SAI, ETA, BSS, or the like, to further determine the physical location of the computing device 900 on the surface of the Earth. In one embodiment, however, the computing device 900 may communicate through other components, provide other information that may be employed to determine a physical location of the device, including, for example, a MAC address, IP address, or the like.

The present disclosure has been described with reference to the accompanying drawings, which form a part hereof, and which show, by way of non-limiting illustration, certain example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in some embodiments" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The present disclosure has been described with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general purpose computer to alter its function as detailed herein, a special purpose computer, ASIC, or other programmable data processing apparatus, such that the instructions, which execute via the processor of the computer or other programmable data processing apparatus, implement the functions/acts specified in the block diagrams or operational block or blocks. In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

For the purposes of this disclosure, a non-transitory computer readable medium (or computer-readable storage medium/media) stores computer data, which data can include computer program code (or computer-executable instructions) that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, optical storage, cloud storage, magnetic storage devices, or any other physical or material medium which can be used to tangibly store the desired information or data or instructions and which can be accessed by a computer or processor.

To the extent the aforementioned implementations collect, store, or employ personal information of individuals, groups, or other entities, it should be understood that such information shall be used in accordance with all applicable laws concerning the protection of personal information. Additionally, the collection, storage, and use of such information can be subject to the consent of the individual to such activity, for example, through well known "opt-in" or "opt-out" processes as can be appropriate for the situation and type of information. Storage and use of personal information can be in an appropriately secure manner reflective of the type of information, for example, through various access control, encryption, and anonymization techniques (for especially sensitive information).

In the preceding specification, various example embodiments have been described with reference to the accompanying drawings. However, it will be evident that various modifications and changes may be made thereto, and additional embodiments may be implemented without departing from the broader scope of the disclosed embodiments as set forth in the claims that follow. The specification and drawings are accordingly to be regarded in an illustrative rather than restrictive sense.

What is claimed is:

1. A method comprising:
   receiving, by a device, a request for Real-Time Kinematic (RTK) functionality in conjunction with execution of an application on the device;
   identifying, by the device, operational characteristics of the device;
   analyzing, by the device, the operational characteristics of the device;
   determining, by the device, based the analyzed operational characteristics, a type of power management profile, the power management profile comprising instructions that control operations of RTK functionality and a manner in which the RTK functionality is used by the device; and
   executing, by the device, the determined type of power management profile, the execution causing the device to implement the RTK functionality in conjunction with the instructions thereby impacting power consumption by the device during the execution of the application.

2. The method of claim 1, further comprising:
   identifying, by the device, movement data related to physical movements of the device;
   identifying, by the device, battery level data of the device that corresponds to a current battery level of the device;
   identifying, by the device, signal strength data of the device that corresponds to RTK signals received from a reference base station; and
   identifying, by the device, battery consumption data that corresponds to current levels of battery consumption by the device and applications executing on the device.

3. The method of claim 2, wherein the operational characteristics of the device comprise at least one of the movement data, the signal strength data, the battery level data and the battery consumption data.

4. The method of claim 2, further comprising:
   analyzing, by the device, the movement data, and determining whether the device has moved at least a threshold amount of distance; and
   identifying, by the device, a RTK update rate based on the movement determination, the RTK update rate corresponding to a frequency of performing the RTK functionality for the application.

5. The method of claim 4, wherein the type of power management profile comprises a movement requirement that is identified based on the movement data.

6. The method of claim 2, further comprising:
   analyzing, by the device, the battery level data and the battery consumption data;
   determining, by the device, based on the analysis, current system average power usage without RTK enabled;
   determining, by the device, based on the analysis, power consumption related to an open RTK channel and reception of RTK signals;
   determining, by the device, an amount of power RTK consumes; and
   determining, by the device, a power drain of using the RTK functionality for the application.

7. The method of claim 6, further comprising:
   enabling, by the device, selection of either the RTK functionality or power conservation based on the determined power drain.

8. The method of claim 6, wherein the type of power management profile comprises a battery drain requirement that is identified based on the battery level data.

9. The method of claim 2, further comprising:
   identifying, by the device, a set of other devices related to the device;
   analyzing, by the device, the signal strength data of the device and signal strength data of each of the other devices in the set of other devices;
   setting, by the device, the device as a primary node and each other device as a secondary node based on the analysis of the signal strength data of each device.

10. The method of claim 9, wherein each device set as a secondary node is caused to operate in low power mode.

11. The method of claim 9, further comprising:
    receiving, by the device, RTK signals from the reference base station;
    receiving, by the device, location information from each secondary node;
    determining, by the device, corrected location information of each secondary node based on the received RTK signals; and
    communicating, by the device, a message comprising the corrected location information to each secondary node.

12. The method of claim 11, wherein the type of power management profile comprises a grouping requirement that is identified based on the signal strength data of the device.

13. The method of claim 2, further comprising:
    analyzing, by the device, the movement data, and determining a speed of the device; and
    comparing, by the device, the speed of the device to a speed threshold, wherein
      the RTK functionality of the device is turned off when the speed of the device surpasses the speed threshold, and
      the RTK functionality is maintained when the speed is at or below the speed threshold.

14. The method of claim 13, further comprising:
    monitoring the movement data of the device; and
    performing the comparison step at predetermined intervals to determine a status of the RTK functionality.

15. The method of claim 13, wherein the speed threshold is based on a context of the movement of the device.

16. The method of claim 1, further comprising:
    identifying, based on the request, a current location of the device, wherein the operational characteristics of the device further comprise the current location of the device.

17. A device comprising:
a processor configured to:
receive a request for Real-Time Kinematic (RTK) functionality in conjunction with execution of an application on the device;
identify operational characteristics of the device;
analyze the operational characteristics of the device;
determine, based the analyzed operational characteristics, a type of power management profile, the power management profile comprising instructions that control operations of RTK functionality and a manner in which the RTK functionality is used by the device; and
execute the determined type of power management profile, the execution causing the device to implement the RTK functionality in conjunction with the instructions thereby impacting power consumption by the device during the execution of the application.

18. The device of claim 17, further comprising:
identify movement data related to physical movements of the device;
identify battery level data of the device that corresponds to a current battery level of the device;
identify signal strength data of the device that corresponds to RTK signals received from a reference base station; and
identify battery consumption data that corresponds to current levels of battery consumption by the device and applications executing on the device,
wherein the operational characteristics of the device comprise at least one of the movement data, the signal strength data, the battery level data and the battery consumption data, and
wherein the type of the power management profile is based on at least one of the operational characteristics.

19. A non-transitory computer-readable medium tangibly encoded with instructions, that when executed by a processor of a device, perform a method comprising:
receiving, by the device, a request for Real-Time Kinematic (RTK) functionality in conjunction with execution of an application on the device;
identifying, by the device, operational characteristics of the device;
analyzing, by the device, the operational characteristics of the device;
determining, by the device, based the analyzed operational characteristics, a type of power management profile, the power management profile comprising instructions that control operations of RTK functionality and a manner in which the RTK functionality is used by the device; and
executing, by the device, the determined type of power management profile, the execution causing the device to implement the RTK functionality in conjunction with the instructions thereby impacting power consumption by the device during the execution of the application.

20. The non-transitory computer-readable medium of claim 19, further comprising:
identifying, by the device, movement data related to physical movements of the device;
identifying, by the device, battery level data of the device that corresponds to a current battery level of the device;
identifying, by the device, signal strength data of the device that corresponds to RTK signals received from a reference base station; and
identifying, by the device, battery consumption data that corresponds to current levels of battery consumption by the device and applications executing on the device,
wherein the operational characteristics of the device comprise at least one of the movement data, the signal strength data, the battery level data and the battery consumption data, and
wherein the type of the power management profile is based on at least one of the operational characteristics.

* * * * *